(12) United States Patent
Tsai

(10) Patent No.: US 8,973,312 B2
(45) Date of Patent: Mar. 10, 2015

(54) SELF-CENTERING DAMPER

(71) Applicant: Chong-Shien Tsai, Taichung (TW)

(72) Inventor: Chong-Shien Tsai, Taichung (TW)

( * ) Notice: Subject to any disclaimer, the term of this patent is extended or adjusted under 35 U.S.C. 154(b) by 0 days.

(21) Appl. No.: 13/922,951

(22) Filed: Jun. 20, 2013

(65) Prior Publication Data
US 2013/0340360 A1 Dec. 26, 2013

(30) Foreign Application Priority Data

Jun. 22, 2012 (TW) .............................. 101122410 A

(51) Int. Cl.
*E04B 1/98* (2006.01)
*F16F 15/02* (2006.01)

(52) U.S. Cl.
CPC ................ *E04B 1/98* (2013.01); *F16F 15/022* (2013.01)
USPC ...... 52/167.3; 52/573.1; 52/657; 267/140.11; 248/636

(58) Field of Classification Search
USPC ............... 52/167.1, 167.3, 167.4, 573.1, 291, 52/657, 655.1; 267/136, 140.11, 89, 90, 267/95; 248/605, 636, 302, 493
See application file for complete search history.

(56) References Cited

U.S. PATENT DOCUMENTS

| | | | | |
|---|---|---|---|---|
| 4,488,511 A | * | 12/1984 | Grassano | 119/798 |
| 5,259,159 A | * | 11/1993 | Kawase et al. | 52/167.1 |
| 5,482,258 A | * | 1/1996 | Clauson et al. | 267/71 |
| 5,694,879 A | * | 12/1997 | Taylor | 114/230.26 |
| 5,946,866 A | * | 9/1999 | Weglewski et al. | 52/167.1 |
| 7,337,586 B2 | * | 3/2008 | Lin et al. | 52/167.1 |
| 7,549,257 B2 | * | 6/2009 | Chuang | 52/167.1 |
| 7,640,825 B2 | * | 1/2010 | Basile et al. | 74/501.5 R |
| 7,712,266 B2 | * | 5/2010 | Sarkisian | 52/167.1 |
| 7,856,765 B1 | * | 12/2010 | Su | 52/167.1 |
| 8,250,818 B2 | * | 8/2012 | Tremblay et al. | 52/167.3 |
| 8,763,320 B1 | * | 7/2014 | Chou et al. | 52/167.3 |
| 2001/0045069 A1 | * | 11/2001 | Constantinou | 52/167.3 |
| 2005/0138870 A1 | * | 6/2005 | Ishimura et al. | 52/167.1 |
| 2005/0257450 A1 | * | 11/2005 | Tsai | 52/167.1 |
| 2006/0101733 A1 | * | 5/2006 | Jen et al. | 52/167.1 |
| 2007/0006538 A1 | * | 1/2007 | Chuang | 52/167.4 |
| 2009/0211180 A1 | * | 8/2009 | Smelser | 52/167.1 |
| 2010/0018134 A1 | * | 1/2010 | Tsai | 52/167.3 |
| 2010/0313496 A1 | * | 12/2010 | Rahimian | 52/167.3 |
| 2012/0260585 A1 | * | 10/2012 | Mualla | 52/167.1 |

* cited by examiner

Primary Examiner — Brian Glessner
Assistant Examiner — Jessie Fonseca
(74) Attorney, Agent, or Firm — Birch, Stewart, Kolasch & Birch, LLP

(57) ABSTRACT

A self-centering damper has an elongated damping body and at least one returning device. The elongated damping body has at least one first wing plate and a supporting element connected to and extending from the first wing plate. The at least one returning device is connected to the damping body and has two holding rib plates respectively connected to the end segments of the damping body, a supporting rib plate securely connected to the damping body between the holding rib plates and at least one pre-stressed stay wire extending through the supporting rib plate and connected the holding rib plates in a tension condition.

24 Claims, 22 Drawing Sheets

SELF-CENTERING DAMPER

BACKGROUND OF THE INVENTION

1. Field of the Invention

The present invention relates to a vibration absorber, and more particularly to a self-centering damper to provide a damping effect to the structure and to be returned to an original position automatically.

2. Description of Related Art

To strengthen the beams and pillars of the main components of a large structure for withstanding vibration energy, the applicant had previously proposed a vibration absorption device for a structure such as the Taiwan Patent Number 1283722. The vibration absorption device has an elongated damper with an I-shaped cross-section. The elongated damper has two narrow sides and a wide middle between the narrow sides to enable the elongated damper to change the moment of inertia distribution of curvature along its section into a uniform distribution of the elongated damper. When the elongated damper is achieved the yield by the force of the earthquake, the overall of the elongated damper is able to reach the yield point and provides an excellent absorption effect of the vibration energy. When the elongated damper is exposed to the force of an earthquake, the overall mass of the elongated damper is able to reach the yield point and provide an excellent absorption effect of the vibration energy.

Although the vibration absorption device for a structure that is disclosed in U.S. Pat. No. 1,283,722 can improve the vibration absorber damping performance by the width change of the side plates of the I-shaped elongated damper, it still absorbs the vibration energy by the I-shaped elongated damper and cannot reach the optimizing technical effect. To uphold the creative spirit of perseverance and research trials, the applicant found that if an auxiliary returning structure is assembled into the I-shaped elongated damper, it will further elevate the vibration absorber damping performance of the elongated damper of structure.

To overcome the shortcomings, the present invention tends to provide a self-centering damper to mitigate or obviate the aforementioned problems.

SUMMARY OF THE INVENTION

The main objective of the invention is to provide self-centering damper to provide a damping effect to the structure and to be returned to an original position automatically.

The self-centering damper in accordance with the present invention has an elongated damping body and at least one returning device. The elongated damping body has at least one first wing plate and a supporting element connected to and extending from the first wing plate. The at least one returning device is connected to the damping body and has two holding rib plates respectively connected to the end segments of the damping body, a supporting rib plate securely connected to the damping body between the holding rib plates and at least one pre-stressed stay wire extending through the supporting rib plate and connected the holding rib plates in a tension condition.

Other objects, advantages and novel features of the invention will become more apparent from the following detailed description when taken in conjunction with the accompanying drawings.

DETAILED DESCRIPTION OF PREFERRED EMBODIMENT

Figure 1:
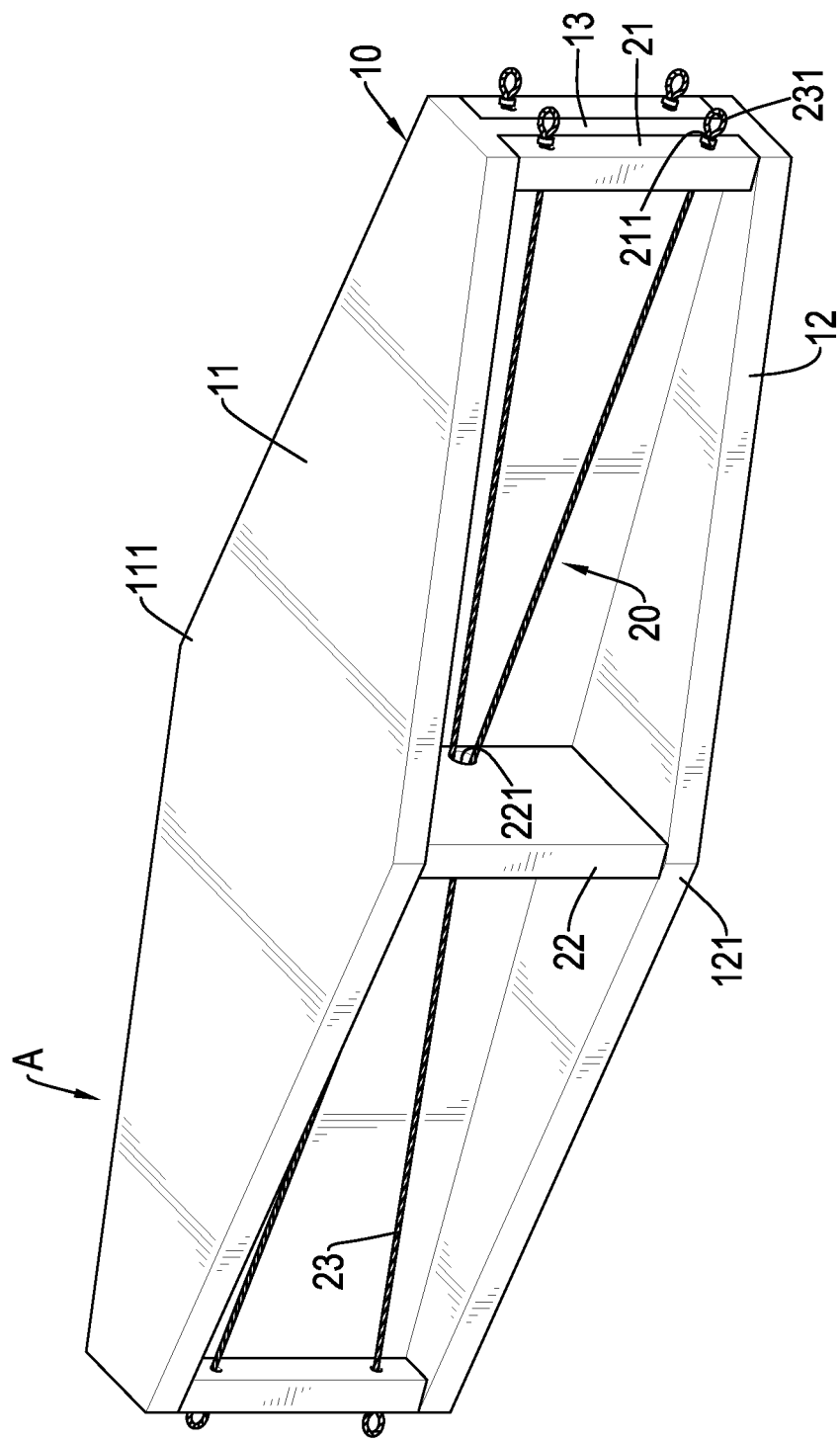
FIG. 1 is a perspective view of a first embodiment of a self-centering damper in accordance with the present invention.

With reference to FIGS. 1 to 16, a self-centering damper A in accordance with the present invention can be applied to a structure, a bridge or an instrument between pillars, beams and braces of such structures, and comprises an elongated damping body 10 and at least one returning device 20. The elongated damping body 10 has two sides, two end segments, at least one first wing plate 11 and a supporting element 13 connected to and extending from the first wing plate 11. The at least one returning device 20 is connected to one of the sides of the damping body 10 and each one of the at least one returning device 20 has two holding rib plates 21 respectively connected to the end segments of the damping body 10, a supporting rib plate 22 securely connected to the damping body 10 between the holding rib plates 21 and at least one pre-stressed stay wire 23 extending through the supporting rib plate 22 and connected to the holding rib plates 21 in a tension condition. The pre-stress force that is provided by the at least one pre-stressed stay wire 23 can provide an automatic returning effect to the self-centering damper A when the self-centering damper A is deformed by a vibration force and this can elevate the vibration absorber damping performance of the self-centering damper A.

The self-centering damper A in accordance with the present invention has several embodiments and will be described as follows.

Figure 2:
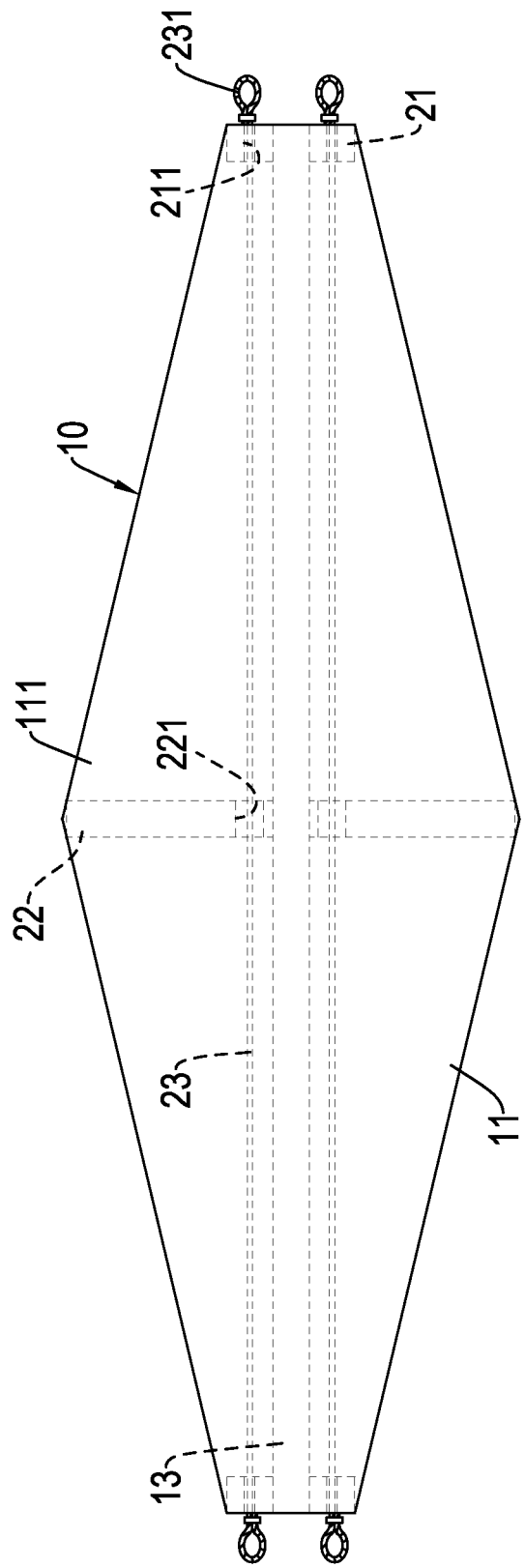
FIG. 2 is a top view of the self-centering damper in FIG. 1.
Figure 3:
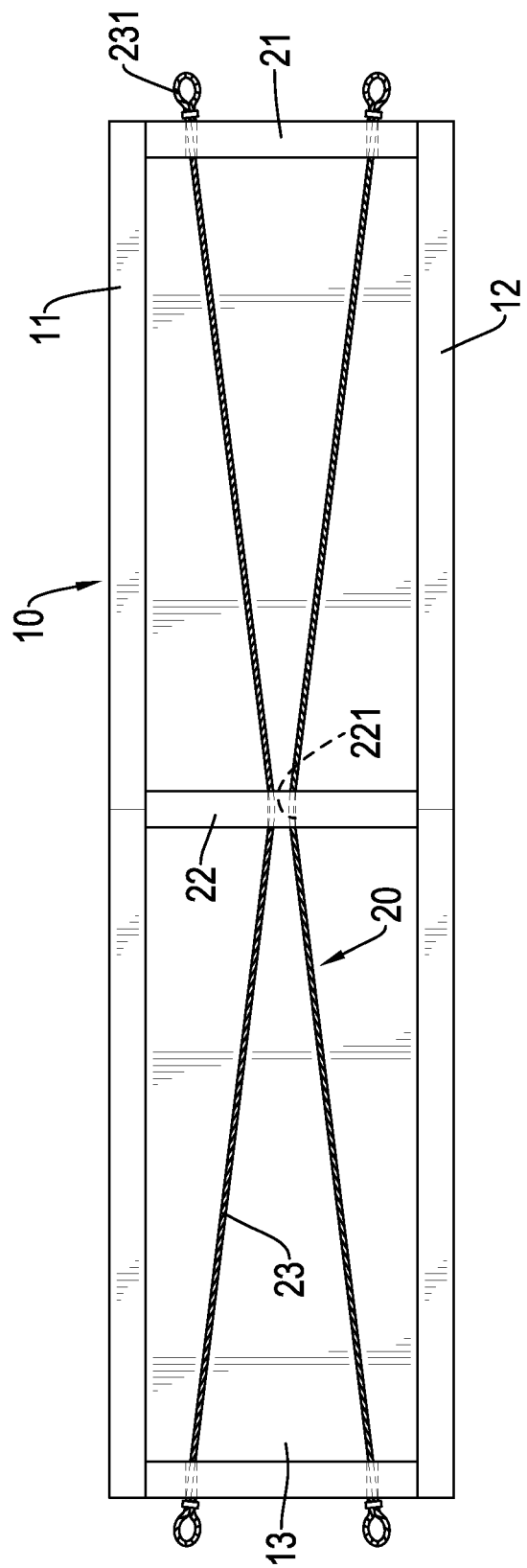
FIG. 3 is a side view of the self-centering damper in FIG. 1.

With reference to FIGS. 1 to 3, a first embodiment of a self-centering damper A in accordance with the present invention has an I-shaped cross-section elongated damping body 10 and two symmetrical returning devices 20. The damping body 10 has a first wing plate 11, a second wing plate 12 and a supporting element 13. The first wing plate 11 has an elongated diamond-shape, two narrow sides, a wide middle and two protrusions 111. The wide middle of the first wing plate 11 has a width wider than widths of the narrow sides of the first wing plate 11 and two opposite sides. The protrusions 111 are respectively formed on and protrude from the opposite sides of the wide middle of the first wing plate 11.

The second wing plate 12 is parallel to the first wing plate 11 and has a shape corresponding to the elongated diamond-shape of the first wing plate 11, i.e., two narrow sides, a wide middle and two protrusions 121. The wide middle of the second wing plate 12 has a width wider than widths of the narrow sides of the second wing plate 12 and two opposite sides. The protrusions 121 are respectively formed on and protrude from the opposite sides of the wide middle of the second wing plate 12.

The supporting element 13 is connected to the wing plates 11, 12 in one piece or by welding or fixing manner.

Each one of the returning devices 20 has two holding rib plates 21, a supporting rib plate 22 and at least one pre-stressed stay wire 23. The holding rib plates 21 are respectively connected to the narrow sides of the wing plates 11, 12 in one piece or by welding or another fixing manner. Each holding rib plate 21 has two holding holes 211 formed through the holding rib plate 21 respectively near the wing plates 11, 12.

The supporting rib plate 22 is connected to the wide middles of the wing plates 11, 12 in one piece or by welding or fixing manner and has a middle and a through hole 221. The through hole 221 is formed through the middle of the supporting rib plate 22. The at least one pre-stressed stay wire 23 extends through the through hole 221 of the supporting rib plate 22 and each one of the at least one pre-stressed stay wire 23 has two ends respectively connected to the holding hole 211 of one of the holding plates 21 and the holding hole 211 of the other holding rib plate 21 to enable the at least one pre-stressed stay wire 23 to take on a tension condition. Preferably, the at least one pre-stressed stay wire 23 is securely connected to the holding rib plates 21 by fixing, or by welding or each one of the at least one pre-stressed stay wire 23 has two tying elements 231 respectively mounted around the ends of the at least one pre-stressed stay wire 23.

In this way, the returning devices 20 are symmetrically connected to the damping body 10 to form the first embodiment of the self-centering damper A in accordance with the present invention as shown in FIGS. 1 to 3. The returning devices 20 that are respectively mounted on the sides of the damping body 10 can be used to provide a pre-stress tension force to the self-centering damper A. When the structure is exposed to the force of the earthquake and the distorting forces of the earthquake is compensated by the deformation of the self-centering damper A. The returning devices 20 can be used to enable the force of the earthquake to be distributed equally and to provide an effect of recovering the deformation to the self-centering damper A, and this can elevate the vibration absorber damping performance of the self-centering damper A.

With reference to FIGS. 4 to 16, the second to fourteenth embodiments have similar structures substantially same as the structures in the first embodiment except the shapes of the wing plates 11, 12 of the damping body 10, the extending type and the amount of the pre-stressed stay wire 23 of the returning device 20 and the assembling position of the supporting rib plate 22. In the present invention, the I-shaped cross section of the damping body 10 is the most effective form of support, however the damping body 10 may have different shapes of the cross section of the damping body 10. Furthermore, the returning device 20 can have one or more pre-stressed stay wires 23.

Figure 4:
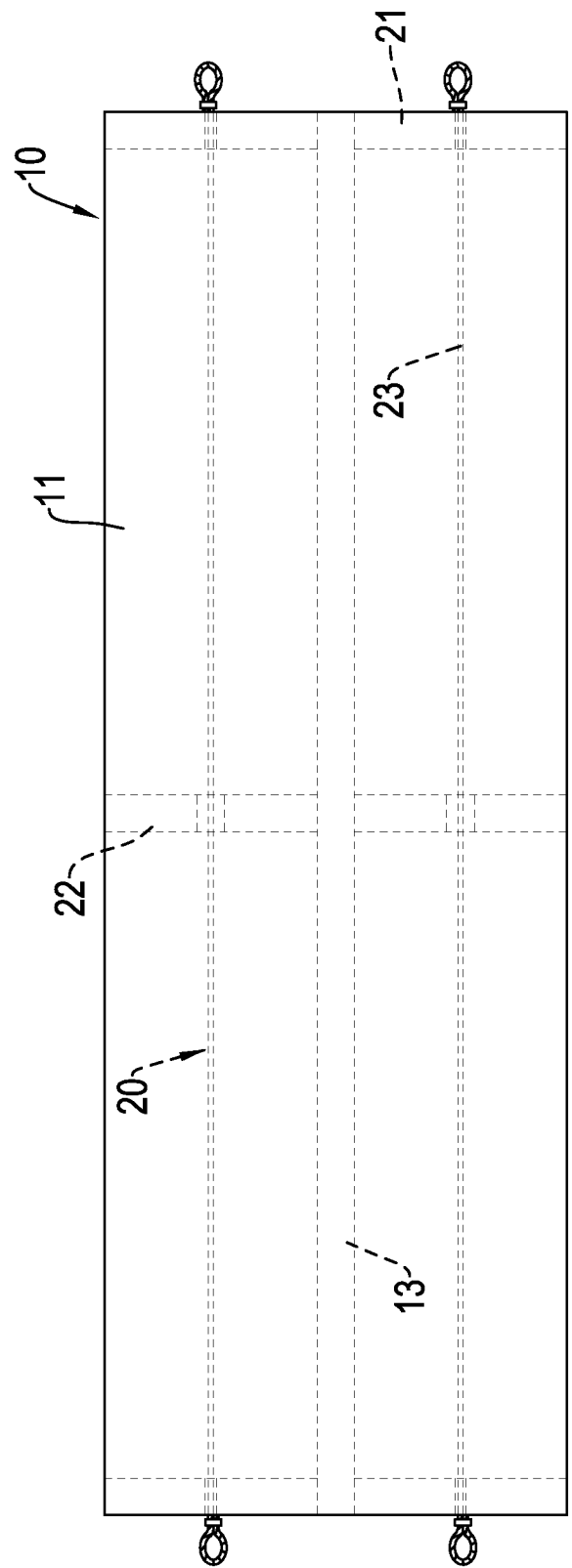
FIG. 4 is a top view of a second embodiment of a self-centering damper in accordance with the present invention.

With reference to FIG. 4, the second embodiment of the self-centering damper A has a structure substantially same as that in the first embodiment except that the shapes of the wing plates 11, 12 are elongated-rectangular.

Figure 5:
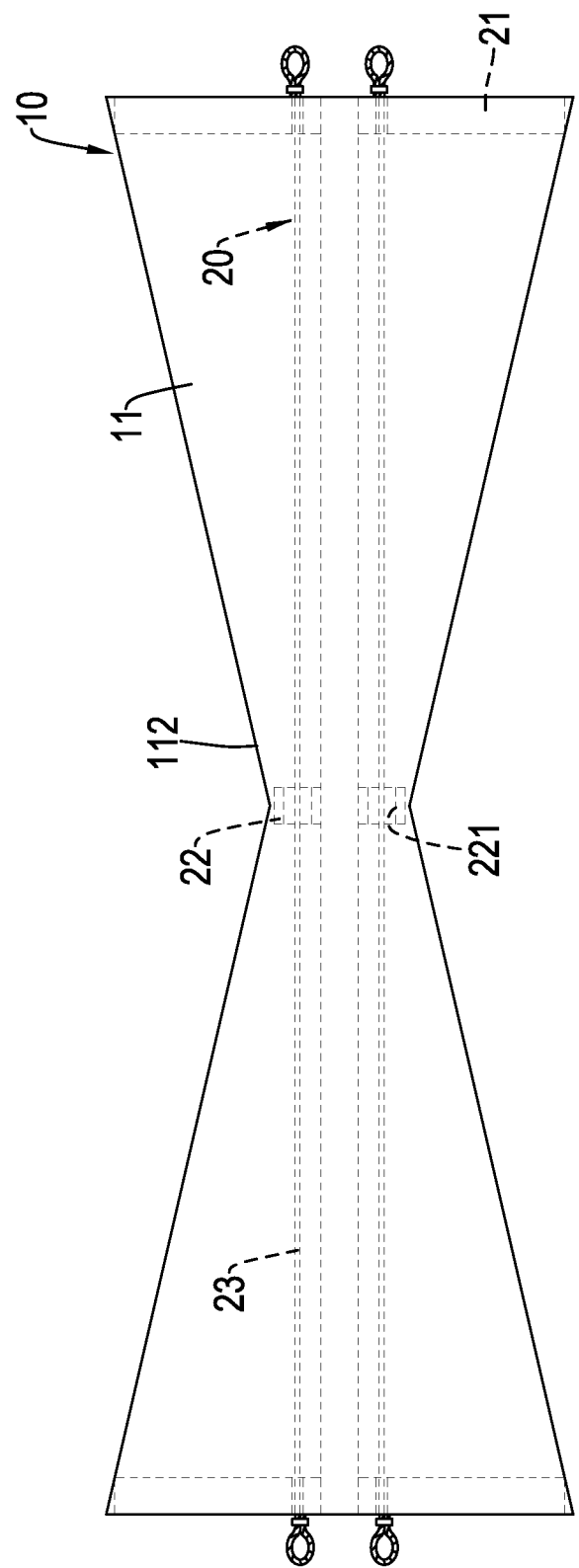
FIG. 5 is a top view of a third embodiment of a self-centering damper in accordance with the present invention.

With reference to FIG. 5, the third embodiment of the self-centering damper A has a structure substantially same as that in the first embodiment except that the widths of the sides of the wing plates 11, 12 are wider than the widths of the middles of the wing plates 11, 12, and each wing plate 11, 12 has two concave segments 112 being V-shaped and respectively formed in the opposite sides of the middle of the corresponding wing plate 11, 12.

Figure 6:
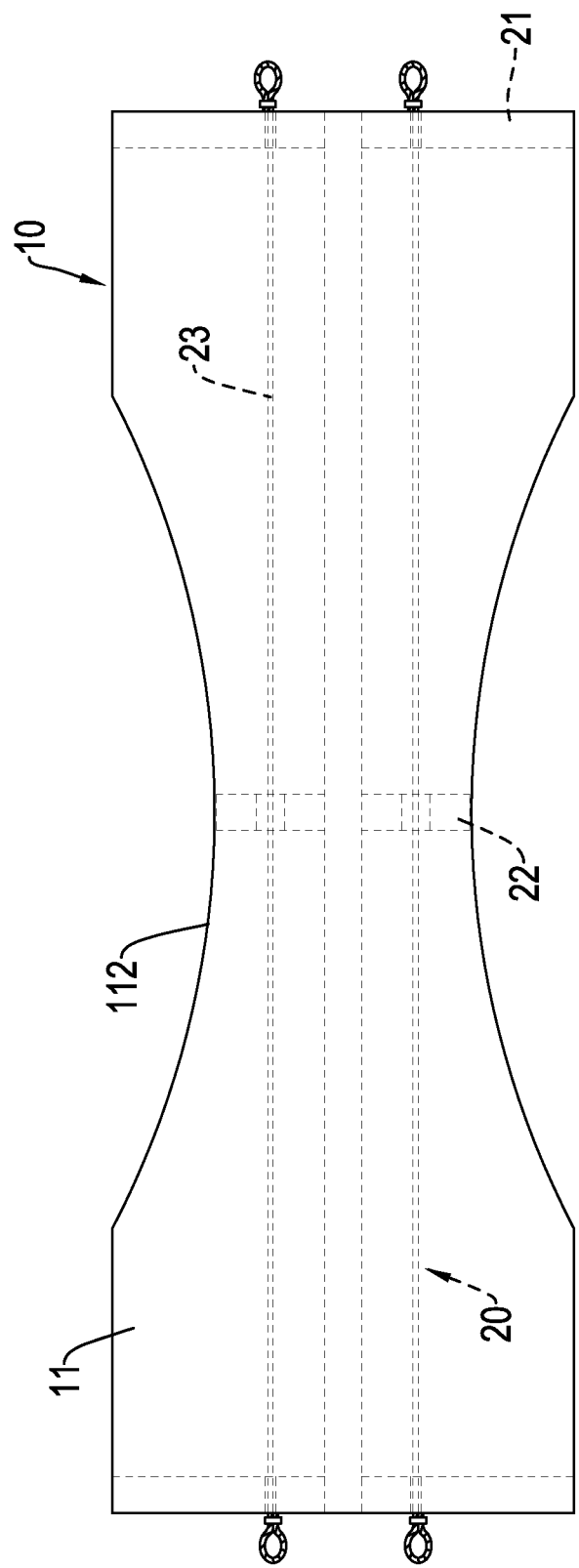
FIG. 6 is a top view of a fourth embodiment of a self-centering damper in accordance with the present invention.

With reference to FIG. 6, the fourth embodiment of the self-centering damper A has a structure substantially same as that in the third embodiment except that the concave segment 112 is curved.

Figure 7:
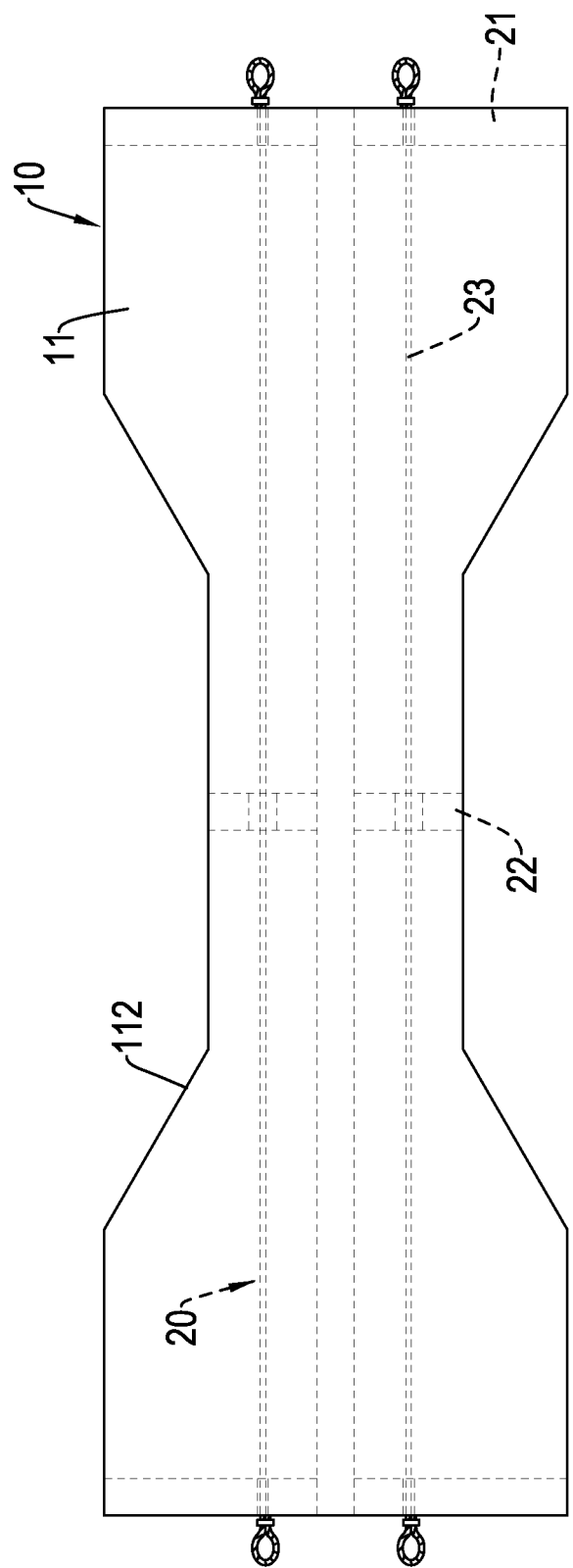
FIG. 7 is a top view of a fifth embodiment of a self-centering damper in accordance with the present invention.

With reference to FIG. 7, the fifth embodiment of the self-centering damper A has a structure substantially same as that in the third embodiment except that the concave segment 112 has a trapezoidal shape.

Figure 8:
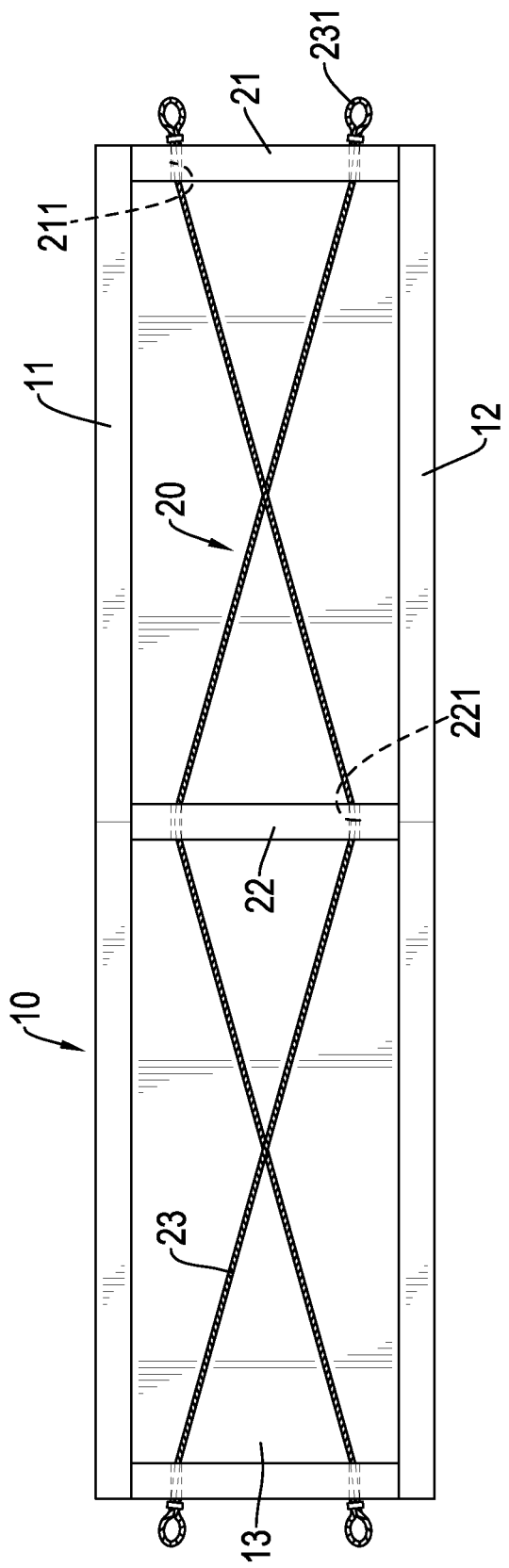
FIG. 8 is a side view of a sixth embodiment of a self-centering damper in accordance with the present invention.

With reference to FIG. 8, the sixth embodiment of the self-centering damper A has a structure substantially the same as that in the first embodiment except for the extending type of the pre-stressed stay wire 23. The supporting rib plate 22 has two through holes 221 formed through the supporting rib plate 22 at an interval and each returning device 20 has at least two pre-stressed stay wires 23 respectively extending through the through holes 221 of the supporting rib plate 22, crossed to each other between the rib plates 21, 22 and respectively connected to the holding holes 211 of the holding rib plates 21.

Figure 9:
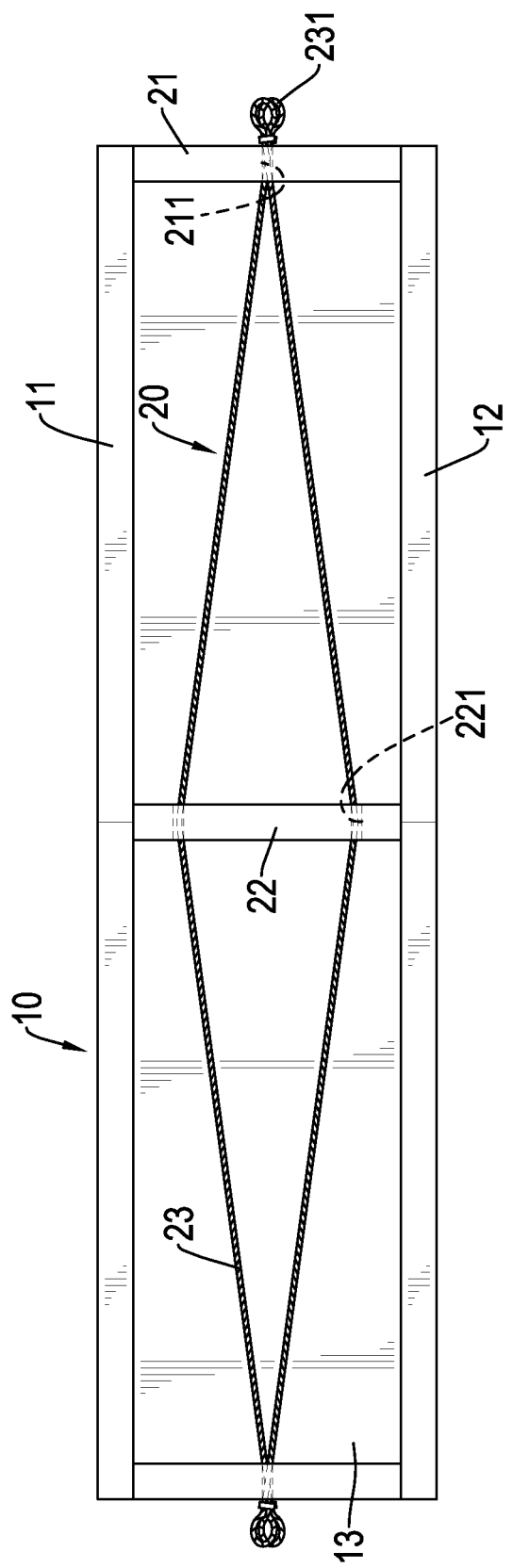
FIG. 9 is a side view of a seventh embodiment of a self-centering damper in accordance with the present invention.

With reference to FIG. 9, the seventh embodiment of the self-centering damper A has a structure substantially the same as that in the first embodiment except for the extending type of the pre-stressed stay wire 23. The supporting rib plate 22 has two through holes 221 formed through the supporting rib plate 22 at an interval and each holding rib plate 21 has a holding hole 211 formed through the corresponding holding rib plate 21. Each returning device 20 has at least two pre-stressed stay wires 23 respectively extending through the through holes 221 of the supporting rib plate 22 and connected to the same holding hole 211 of one of the holding rib plates 21 and the same holding hole 211 of the other holding rib plate 21.

Figure 10:
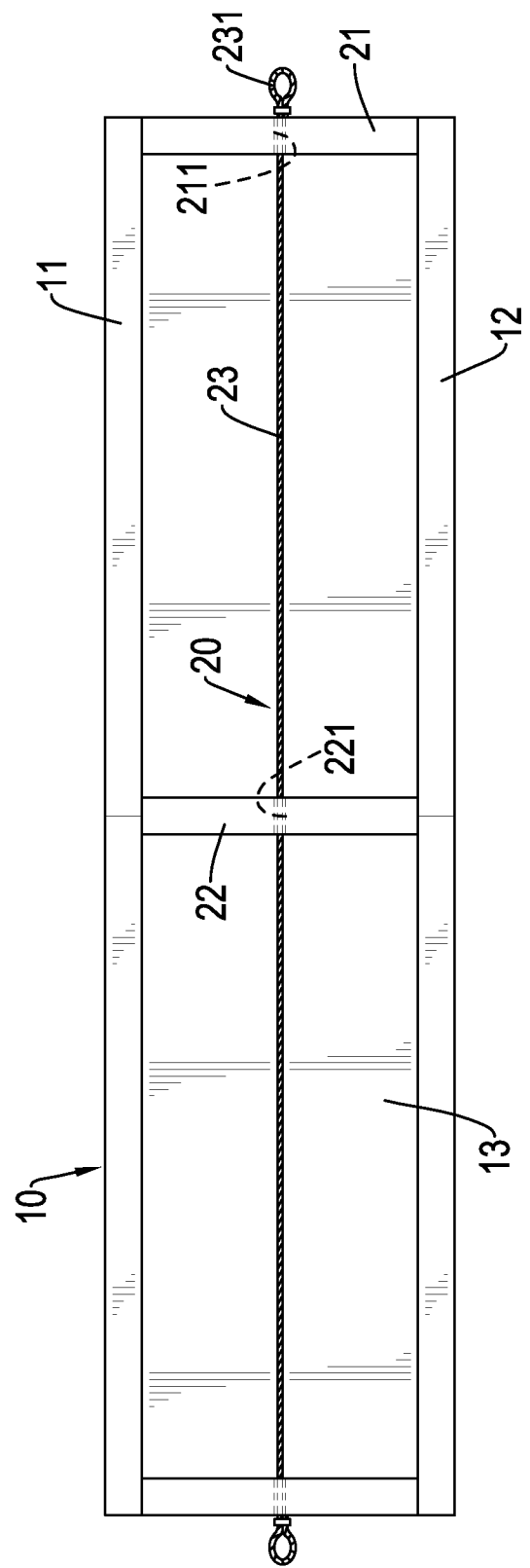
FIG. 10 is a side view of an eighth embodiment of a self-centering damper in accordance with the present invention.

With reference to FIG. 10, the eighth embodiment of the self-centering damper A has a structure substantially the same as that in the first embodiment except for the extending type of the pre-stressed stay wire 23. The supporting rib plate 22 has a through holes 221 formed through the supporting rib plate 22 and each holding rib plate 21 has a holding hole 211 formed through the corresponding holding rib plate 21 and aligning with the through hole 221 of the supporting rib plate 22. The at least one pre-stressed stay wire 23 of each returning device 20 extends through the through hole 221 of the supporting rib plate 22 and two opposed ends of the pre-stressed stay wire 23 are respectively connected to the two holding holes 211 of the holding rib plates 21.

Figure 11:
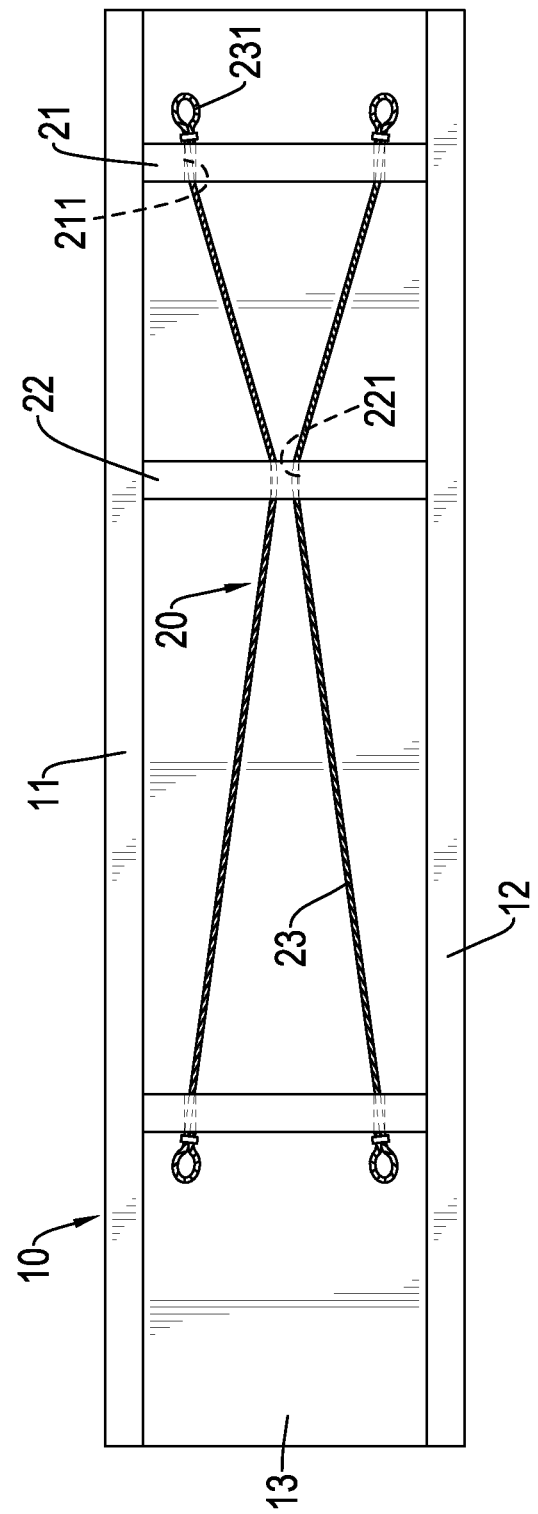
FIG. 11 is a side view of a ninth embodiment of a self-centering damper in accordance with the present invention.

With reference to FIG. 11, the ninth embodiment of the self-centering damper A has a structure substantially the same as that in the first embodiment except for the assembling position of the supporting rib plate 22. The supporting rib plate 22 of each one of the at least one returning device 20 is not mounted on middles of the wing plates 11, 12 and may be mounted on any position between the holding rib plates 21 of the corresponding returning device 20 and the wing plates 11, 12. Preferably, the ratio of distance of the supporting rib plate 22 respectively to the holding rib plates 21 is 2:1.

Figure 12:
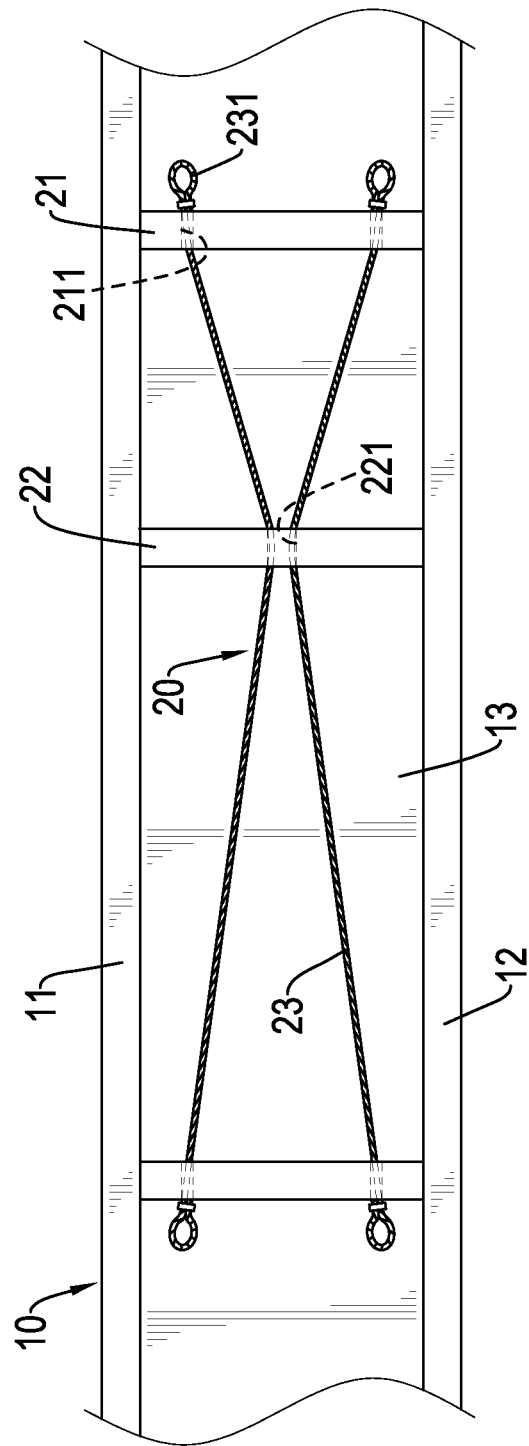
FIG. 12 is a side view of a tenth embodiment of a self-centering damper in accordance with the present invention.

With reference to FIG. 12, the tenth embodiment of the self-centering damper A has a structure substantially same as that in the ninth embodiment except that the damping body 10 may be an individual component or a part of a structure beam.

Figure 13:
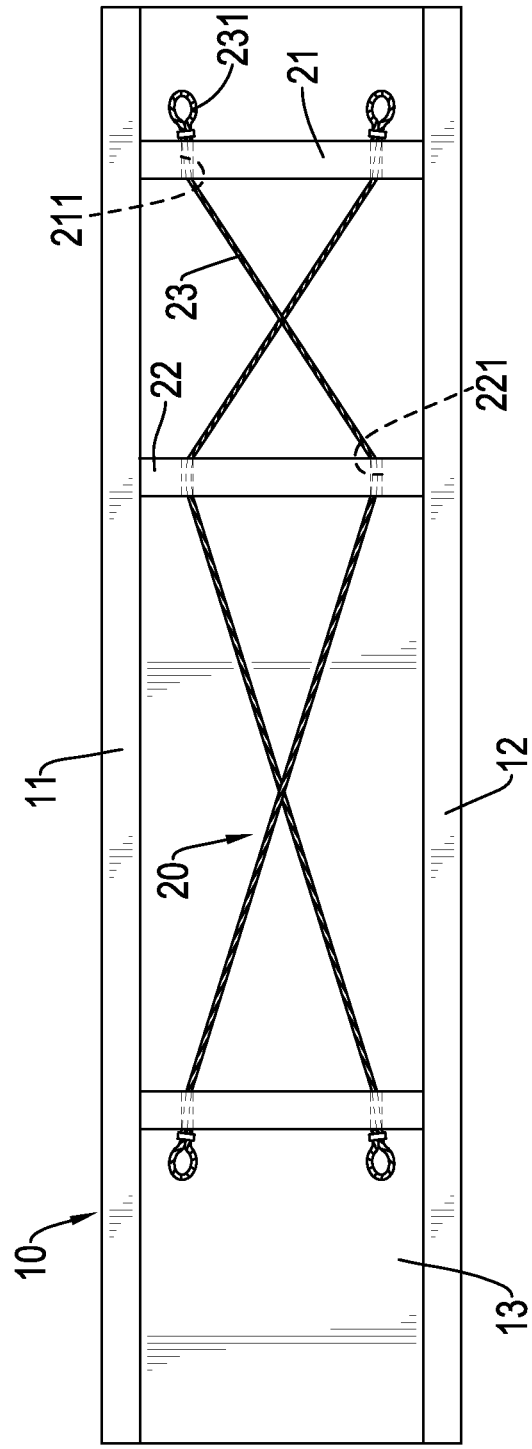
FIG. 13 is a side view of an eleventh embodiment of a self-centering damper in accordance with the present invention.

With reference to FIG. 13, the eleventh embodiment of the self-centering damper A has a structure substantially same as that in the sixth embodiment except for the assembling position of the supporting rib plate 22. The supporting rib plate 22 of each one of the at least one returning device 20 is not mounted on the middles of the wing plates 11, 12 and maybe mounted on any position between the holding rib plates 21 of the corresponding returning device 20 and the wing plates 11, 12. Furthermore, the distances of the supporting rib plate 22 respectively to the holding rib plates 21 are different.

Figure 14:
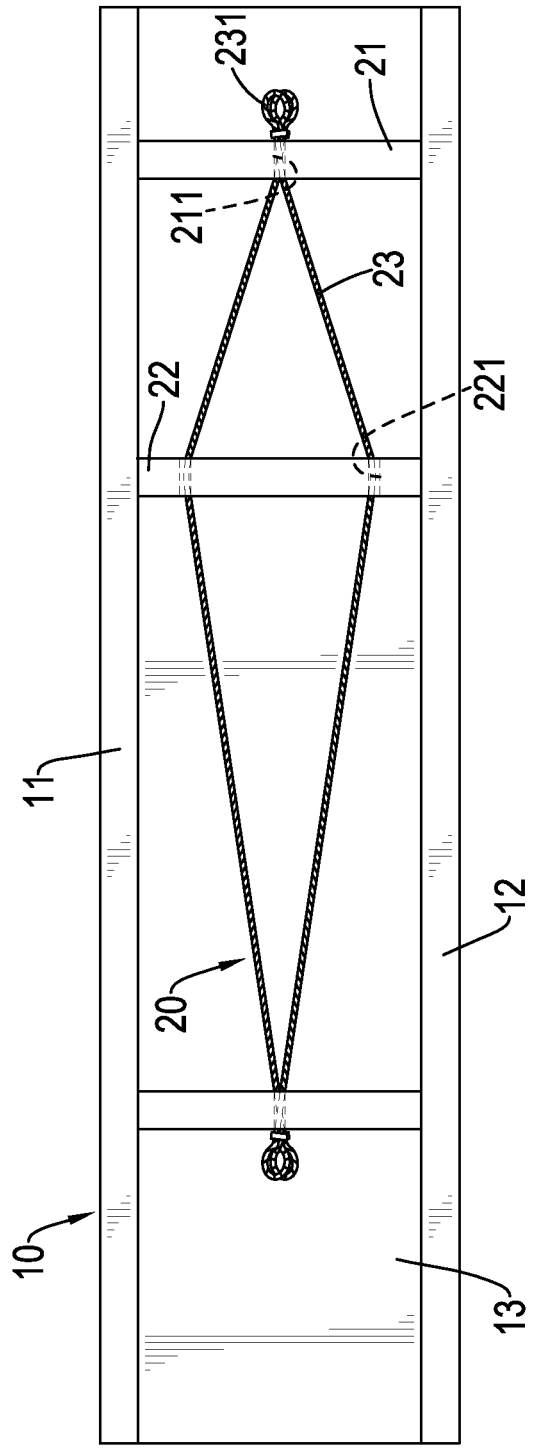
FIG. 14 is a side view of a twelfth embodiment of a self-centering damper in accordance with the present invention.

With reference to FIG. 14, the twelfth embodiment of the self-centering damper A has a structure substantially same as that in the eleventh embodiment except that each holding rib plate 21 has a holding hole 211, the at least two pre-stressed stay wires 23 respectively extend through the two through holes 221 of the supporting rib plate 22 and are connected to the same holding hole 211 of one of the holding rib plates 21 and the same holding hole 211 of the other holding rib plate 21.

Figure 15:
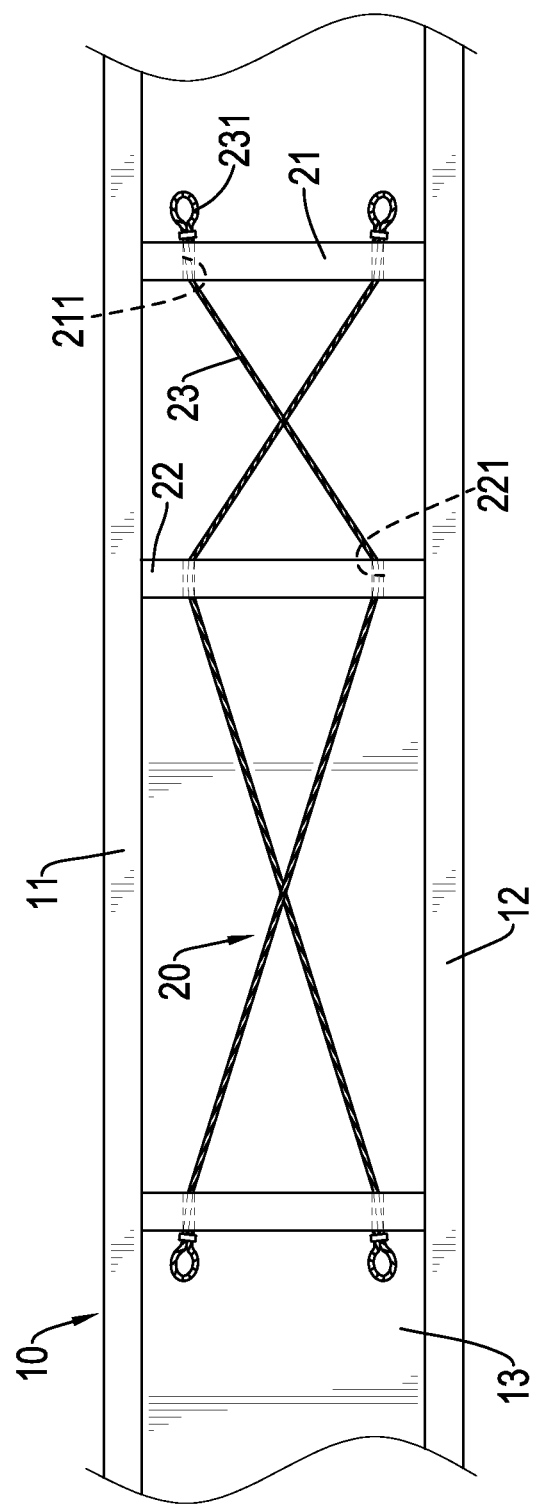
FIG. 15 is a side view of a thirteenth embodiment of a self-centering damper in accordance with the present invention.

With reference to FIG. 15, the thirteenth embodiment of the self-centering damper A has a structure substantially the same as that in the eleventh embodiment except that the damping body 10 may be a part of a structure beam.

Figure 16:
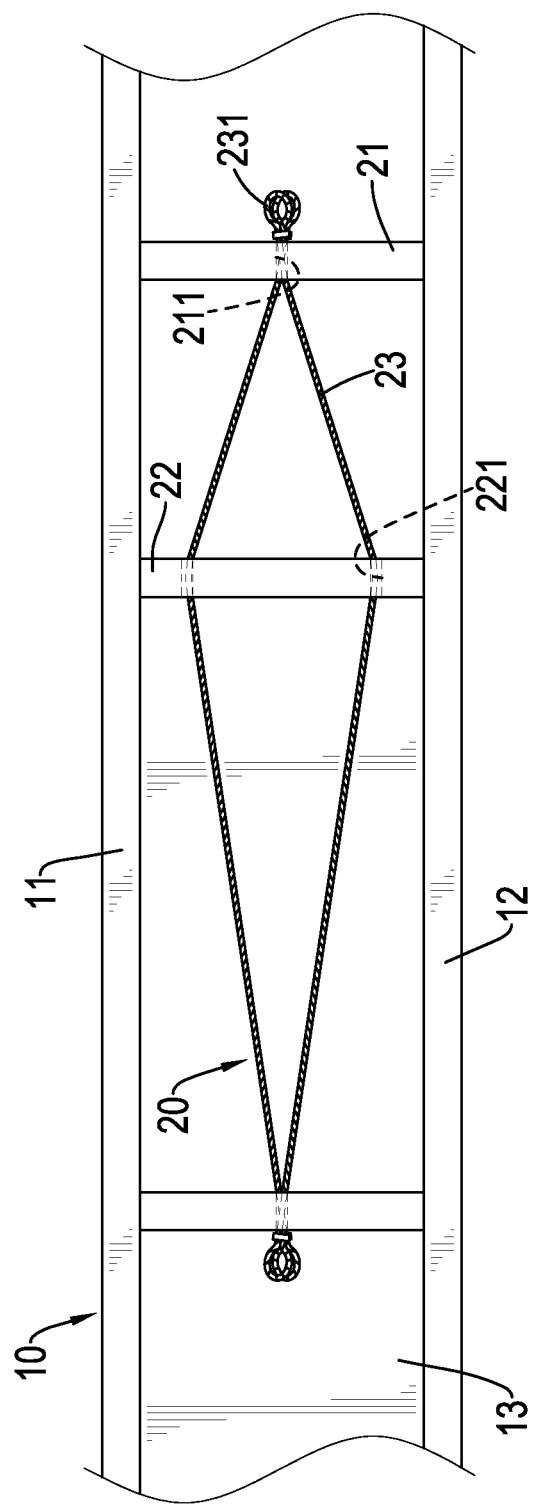
FIG. 16 is a side view of a fourteenth embodiment of a self-centering damper in accordance with the present invention.

With reference to FIG. 16, the fourteenth embodiment of the self-centering damper A has a structure substantially same as that in the thirteenth embodiment except that each holding rib plate 21 has a holding hole 211, the at least two pre-stressed stay wires 23 respectively extend through the two through holes 221 of the supporting rib plate 22 and are connected to the same holding hole 211 of one of the holding rib plates 21 and the same holding hole 211 of the other rib plate 21.

Figure 17:
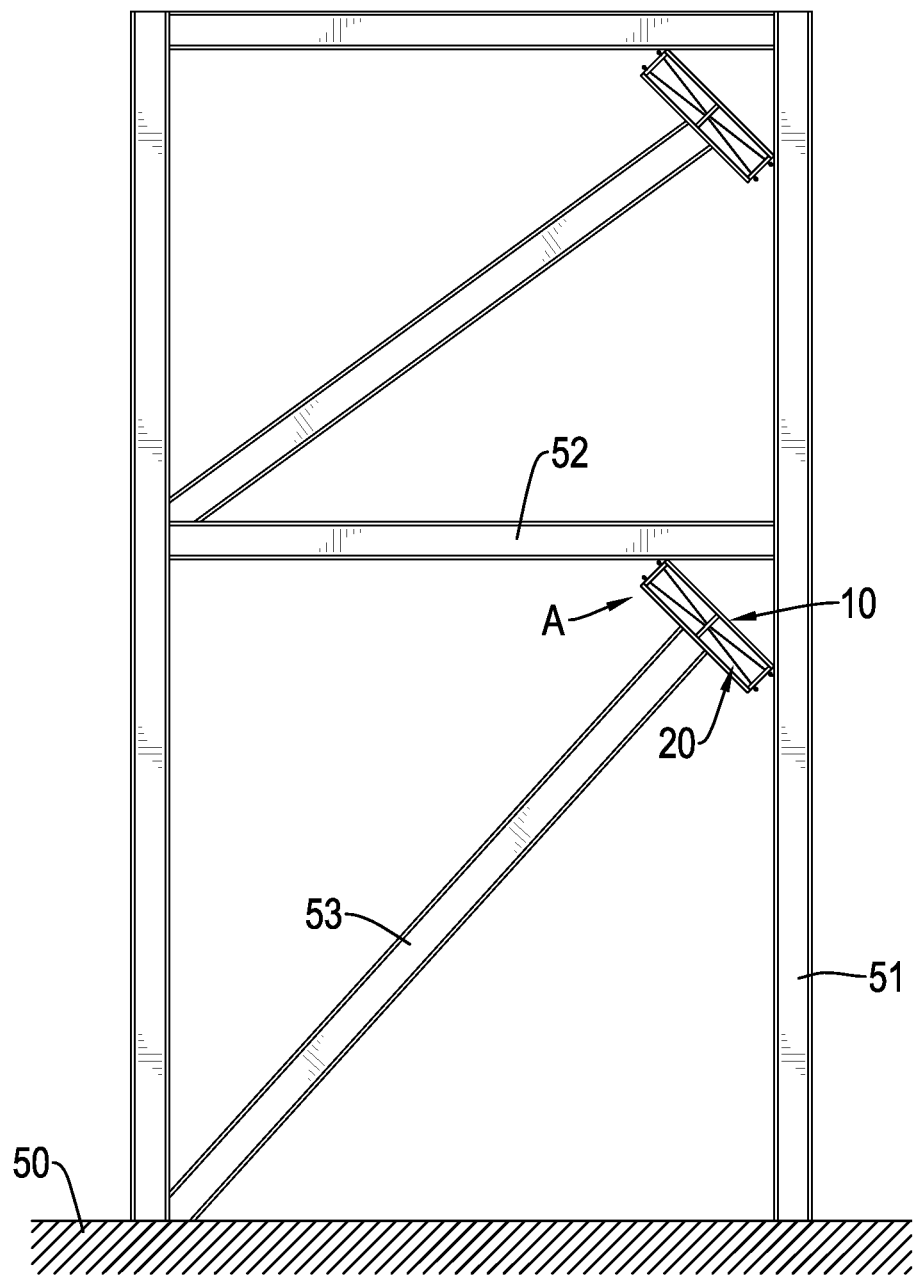
FIG. 17 is an operating side view of the self-centering damper in accordance with the present invention in a first assembling status.

There are six assembling statuses of the self-centering damper A in accordance with the present invention and respectively shown in FIGS. 17 to 22. With reference to FIG. 17, in the first assembling status, a structure has a base 50, multiple pillars 51 vertically mounted on the base 50 and multiple beams 52 connected to the pillars 51. Multiple self-centering dampers A in accordance with the present invention are aslant assembled on the connections of the pillars 51 and the beams 52 and are respectively held by braces 53 to provide a preferred vibration absorber damping performance to the structure.

Figure 18:
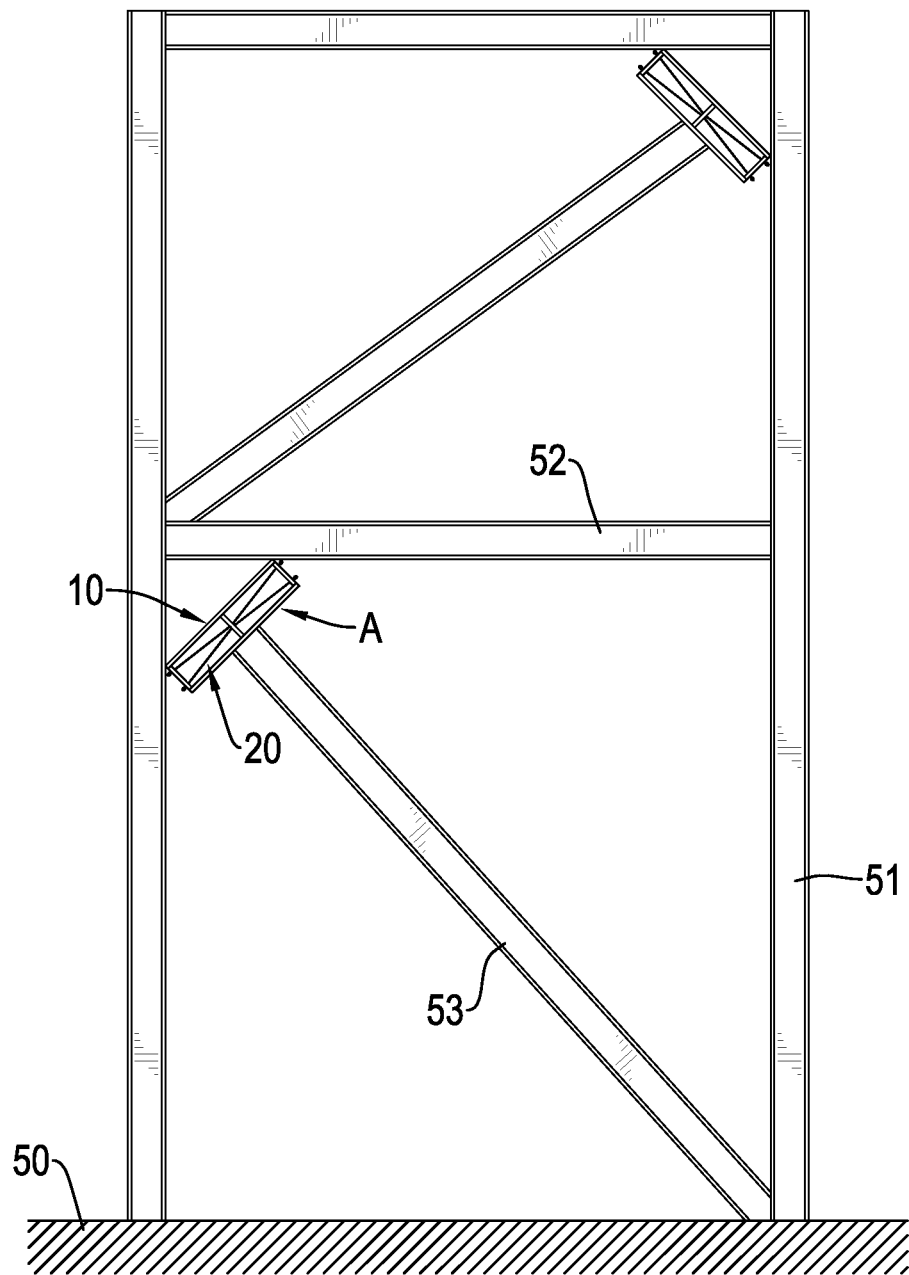
FIG. 18 is an operating side view of the self-centering damper in accordance with the present invention in a second assembling status.
Figure 19:
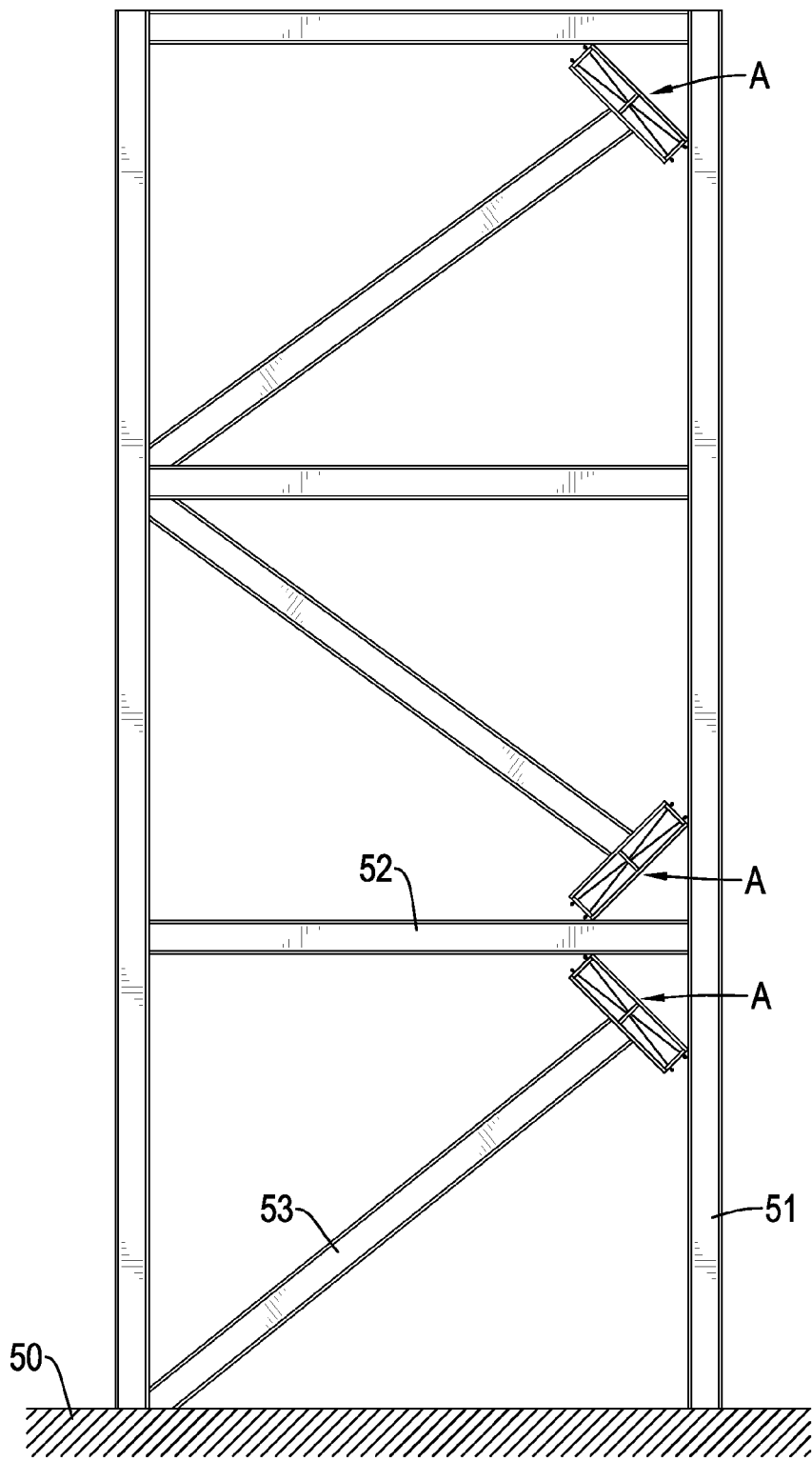
FIG. 19 is an operating side view of the self-centering damper in accordance with the present invention in a third assembling status.

With reference to FIGS. 18 and 19, multiple self-centering damper A in accordance with the present invention are aslant assembled on the connections of the pillars 51 and the beams 52 in an alternative arrangement and are respectively held by braces 53 to provide a preferred vibration absorber damping performance to the structure.

Figure 20:
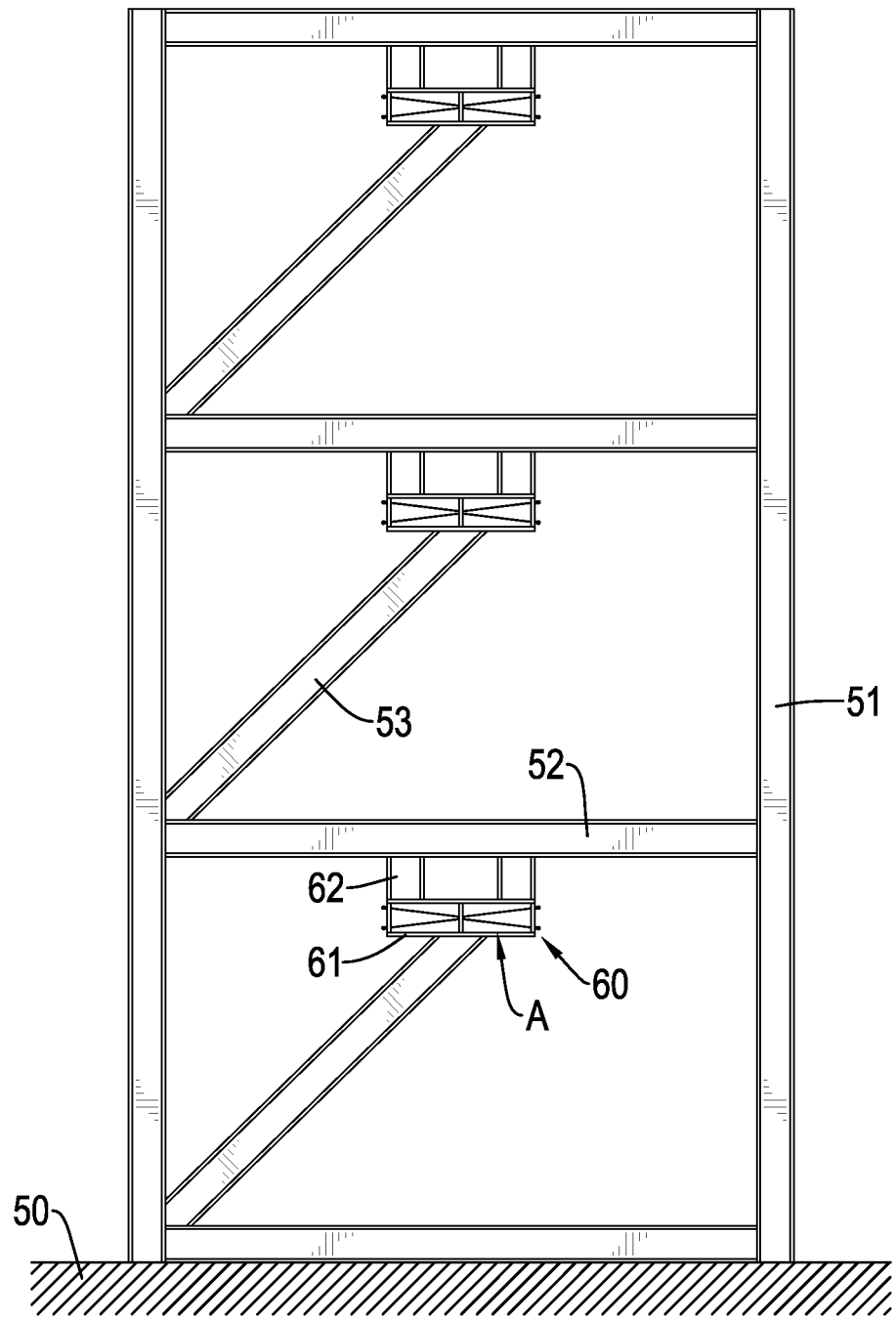
FIG. 20 is an operating side view of the self-centering damper in accordance with the present invention in a fourth assembling status.
Figure 21:
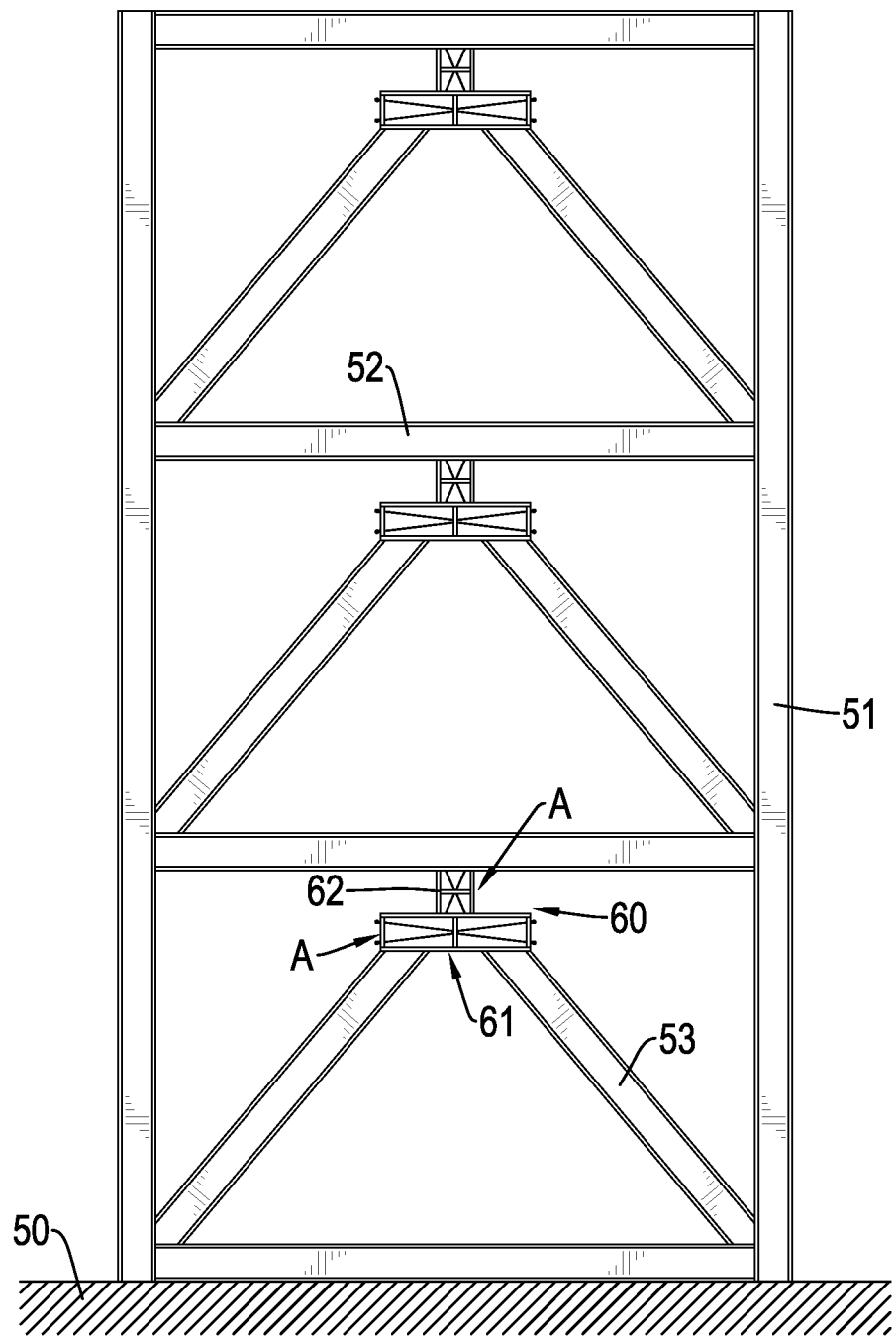
FIG. 21 is an operating side view of the self-centering damper in accordance with the present invention in a fifth assembling status.

With reference to FIG. 20, a vibration-absorbing device 60 is securely mounted between a beam 52 and a brace 53 and has a transversal pillar 61 and two longitudinal pillars 62. The transversal pillar 61 is mounted on the corresponding brace 53. The longitudinal pillars 62 are respectively connected to the ends of the transversal pillar 61 and are mounted on the middle of the corresponding beam 52. The self-centering damper A in accordance with the present invention is assembled in the transversal pillar 61. With reference to FIG. 21, a vibration-absorbing device 60 is securely mounted between a beam 52 and two brace 53 and has a transversal pillar 61 and a longitudinal pillar 62. The transversal pillar 61 is mounted on the corresponding braces 53. The longitudinal pillar 62 is connected to the middle of the transversal pillar 61 and is mounted on the middle of the corresponding beam 52. Two of the self-centering dampers A in accordance with the present invention are respectively assembled in the transversal pillar 61 and the longitudinal pillar 62. Then, the self-centering dampers A in accordance with the present invention can be selectively assembled in the transversal pillar 61 or the longitudinal beam 62 of the vibration-absorbing device 60 and this can provide a preferred vibration absorber damping performance to the structure.

Figure 22:
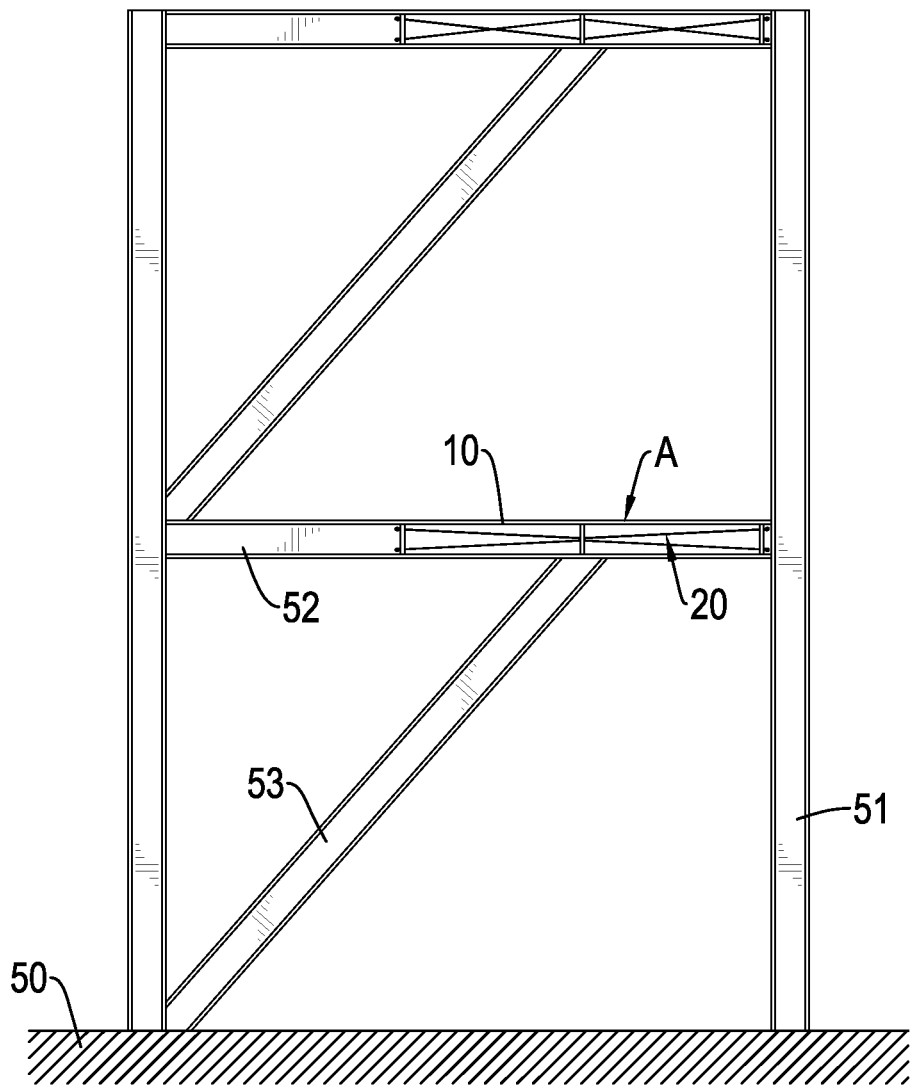
FIG. 22 is an operating side view of the self-centering damper in accordance with the present invention in a sixth assembling status.

With reference to FIG. 22, the self-centering dampers A in accordance with the present invention are directly assembled in the beam 52 of the structure and each is held by a corresponding brace 53 and this also can provide a preferred vibration absorber damping performance to the structure.

The self-centering damper A in accordance with the present invention as described have the following advantages.

1. In the present invention, at least one returning device 20 is mounted on a side of the damping body 10, and each of the at least one returning device 20 has at least one pre-stressed stay wire 23 to provide a pre-stressed force to the self-centering damper A. When the self-centering dampers A is deformed by a vibration force, the at least one returning device 20 can provide a returning effect to the self-centering damper A and can elevate the vibration absorber damping performance of the self-centering damper A.

2. The at least one pre-stressed stay wire 23 of each returning device 20 can be used to enable the force to distribute evenly when the damping body 10 is affected by the earthquake force, and this can improve the absorbing vibration energy performance of the self-centering damper A.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A self-centering damper comprising:
   an elongated damping body having
      two sides;
      two end segments;
      an I-shaped cross-section;
      a first wing plate having:
         two sides, each of the two sides having a width;
         a middle, having:

a width narrower than the width of each of the two sides of the first wing plate; and
two opposite sides; and
two concave segments respectively formed on the opposite sides of the middle of the first wing plate;
a second wing plate parallel to the first wing plate, the second wing plate having:
two sides, each of the two sides having a width;
a middle, having:
a width narrower than the width of each of the two sides of the second wing plate; and
two opposite sides; and
two concave segments respectively formed on the opposite sides of the middle of the second wing plate; and
a supporting element connected to the first wing plate and the second wing plate; and
at least one returning device connected to one of the sides of the damping body and each one of the at least one returning device having
two holding rib plates respectively connected to the end segments of the damping body;
a supporting rib plate securely connected to the damping body between the holding rib plates; and
at least one pre-stressed stay wire extending through the supporting rib plate and connected to the holding rib plates in a tension condition.

2. The self-centering damper as claimed in claim 1, wherein each concave segment is V-shaped, U-shaped or trapezoidal shaped.

3. The self-centering damper as claimed in claim 2, wherein the damper has two returning devices respectively and symmetrically connected to the sides of the damping body.

4. The self-centering damper as claimed in claim 3, wherein
the supporting rib plate of each one of the returning devices has a through hole formed through the supporting rib plate;
each one of the holding rib plates of each one of the returning devices has a holding hole formed through the holding rib plate; and
the at least one pre-stressed stay wire of each one of the returning devices extends through the through hole of the corresponding supporting rib plate and connected to the holding holes of the corresponding holding rib plates.

5. The self-centering damper as claimed in claim 3, wherein
the supporting rib plate of each one of the returning devices has a through hole formed through a middle of the supporting rib plate;
each one of the holding rib plates of each one of the returning devices has two holding holes formed through the holding rib plate respectively near the first and second wing plates; and
each one of the returning devices has at least two pre-stressed stay wires extending through the through hole of the corresponding supporting rib plate, and one of the at least two pre-stressed stay wires connected to one of the holding holes of one of the holding rib plates and the other one of the at least two pre-stressed stay wires connected to the other holding hole of the corresponding holding rib plate.

6. The self-centering damper as claimed in claim 3, wherein
the supporting rib plate of each one of the returning devices has two through holes formed through the supporting rib plate;
each one of the holding rib plates of each one of the returning devices has two holding holes formed through the holding rib plate respectively near the first and second wing plates; and
each one of the returning devices has at least two pre-stressed stay wires respectively extending through the through holes of the corresponding supporting rib plate, crossed to each other between the corresponding supporting rib plate and the corresponding holding rib plates and respectively connected to the holding holes of the corresponding holding rib plates.

7. The self-centering damper as claimed in claim 6, wherein the distances between the supporting rib plate and the holding rib plates of each one of the returning devices are the same.

8. The self-centering damper as claimed in claim 6, wherein the distances between the supporting rib plate and the holding rib plates of each one of the returning devices are unequal.

9. The self-centering damper as claimed in claim 3, wherein
the supporting rib plate of each one of the returning devices has two through holes formed through the supporting rib plate respectively near the first and second wing plates;
each one of the holding rib plates of each one of the returning devices has a holding hole formed through a middle of the holding rib plate; and
each one of the returning devices has at least two pre-stressed stay wires respectively extending through the through holes of the corresponding supporting rib plate, and each pre-stressed stay wire has two ends respectively connected to the holding hole of one of the corresponding holding rib plates and the holding hole of the other corresponding holding rib plate.

10. The self-centering damper as claimed in claim 9, wherein the distances between the supporting rib plate and the holding rib plates of each one of the returning devices are the same.

11. The self-centering damper as claimed in claim 9, wherein the distances between the supporting rib plate and the holding rib plates of each one of the returning devices are unequal.

12. The self-centering damper as claimed in claim 3, wherein the damping body is an individual damper.

13. The self-centering damper as claimed in claim 3, wherein the damping body is a part of a beam of a structure.

14. The self-centering damper as claimed in claim 1, wherein the damper has two returning devices respectively and symmetrically connected to the sides of the damping body.

15. The self-centering damper as claimed in claim 14, wherein the supporting rib plate of each one of the returning devices has a through hole formed through the supporting rib plate;
each one of the holding rib plates of each one of the returning devices has a holding hole formed through the holding rib plate; and
the at least one pre-stressed stay wire of each one of the returning devices extends through the through hole of the corresponding supporting rib plate and connected to the holding holes of the corresponding holding rib plates.

16. The self-centering damper as claimed in claim 14, wherein the supporting rib plate of each one of the returning devices has a through hole formed through a middle of the supporting rib plate;

each one of the holding rib plates of each one of the returning devices has two holding holes formed through the holding rib plate respectively near the first and second wing plates; and each one of the returning devices has at least two pre-stressed stay wires extending through the through hole of the corresponding supporting rib plate, and one of the at least two pre-stressed stay wires connected to one of the holding holes of one of the holding rib plates and the other one of the at least two pre-stressed stay wires connected to the other holding hole of the corresponding holding rib plate.

17. The self-centering damper as claimed in claim 14, wherein the supporting rib plate of each one of the returning devices has two through holes formed through the supporting rib plate;

each one of the holding rib plates of each one of the returning devices has two holding holes formed through the holding rib plate respectively near the first and second wing plates; and each one of the returning devices has at least two pre-stressed stay wires respectively extending through the through holes of the corresponding supporting rib plate, crossed to each other between the corresponding supporting rib plate and the corresponding holding rib plates and respectively connected to the holding holes of the corresponding holding rib plates.

18. The self-centering damper as claimed in claim 17, wherein the distances between the supporting rib plate and the holding rib plates of each one of the returning devices are the same.

19. The self-centering damper as claimed in claim 17, wherein the distances between the supporting rib plate and the holding rib plates of each one of the returning devices are unequal.

20. The self-centering damper as claimed in claim 14, wherein the supporting rib plate of each one of the returning devices has two through holes formed through the supporting rib plate respectively near the first and second wing plates;

each one of the holding rib plates of each one of the returning devices has a holding hole formed through a middle of the holding rib plate; and each one of the returning devices has at least two pre-stressed stay wires respectively extending through the through holes of the corresponding supporting rib plate, and each pre-stressed stay wire has two ends respectively connected to the holding hole of one of the corresponding holding rib plates and the holding hole of the other corresponding holding rib plate.

21. The self-centering damper as claimed in claim 20, wherein the distances between the supporting rib plate and the holding rib plates of each one of the returning devices are the same.

22. The self-centering damper as claimed in claim 20, wherein the distances between the supporting rib plate and the holding rib plates of each one of the returning devices are unequal.

23. The self-centering damper as claimed in claim 14, wherein the damping body is an individual damper.

24. The damper as claimed in claim 14, wherein the damping body is a part of a beam of a structure.

* * * * *